United States Patent

Zulu

[11] Patent Number: 5,529,136
[45] Date of Patent: Jun. 25, 1996

[54] ARTICULATED MACHINE WITH POWERED DIFFERENTIAL STEERING

[75] Inventor: Joshua Zulu, Chillicothe, Ill.

[73] Assignee: Caterpillar Inc., Peoria, Ill.

[21] Appl. No.: 422,365

[22] Filed: Apr. 13, 1995

[51] Int. Cl.⁶ .................................................. B62D 11/18
[52] U.S. Cl. ........................................ 180/6.44; 180/419
[58] Field of Search ...................................... 180/132, 134, 180/135, 6.2, 6.44, 6.62, 6.64, 6.66, 14.1

[56] References Cited

U.S. PATENT DOCUMENTS

| | | | |
|---|---|---|---|
| 2,004,929 | 6/1935 | Centervall | 180/6.44 X |
| 2,352,483 | 6/1944 | Jandasek | 180/6.44 |
| 3,151,694 | 10/1964 | Rogers | 180/6.64 X |
| 4,142,842 | 3/1979 | Hicks et al. | 417/288 |
| 4,249,629 | 2/1981 | Hutt | 180/134 |
| 5,396,768 | 3/1995 | Zulu | 60/487 |

*Primary Examiner*—Kevin T. Hurley
*Attorney, Agent, or Firm*—J. W. Burrows

[57] ABSTRACT

Articulated machines normally have a well known mechanical beveled gear arrangement for dividing power between the respective drive wheels and a differential lock that locks the two drive wheels when traveling in a straight direction. Likewise, articulated machines normally use externally mounted hydraulic cylinders to provide steering of the articulated machine by causing a front unit to articulate relative to the rear unit. In the subject invention, a unitary powered differential and steering mechanism is provided and includes a gear differential portion that provides input to respective first and second output drive members through a gear differential portion. Additionally, a hydro-mechanical portion is included and operatively disposed between the input member of the gear differential portion and one of the first and second output drive members. The hydro-mechanical portion includes a rotatable motor that is operative to lock the first and second output drive members together and to selectively cause one of the first and second output members to rotate at a relative speed different from the other to cause steering of the articulated machine. During the steering, continuous power is being delivered to both of the first and second output drive members.

5 Claims, 2 Drawing Sheets

ARTICULATED MACHINE WITH POWERED DIFFERENTIAL STEERING

TECHNICAL FIELD

This invention relates generally to the steering of articulated machines and, more particularly, to using an arrangement for powered differential locking and/or steering of articulated machines.

BACKGROUND ART

Articulated machines, such as wheel loaders, tractor scrapers and trucks have normally used one or more hydraulic cylinders to cause one unit of the articulated machine to articulate with respect to the other unit in order to provide steering. In most of these articulated machines, the hydraulic cylinders are connected between the front and rear units and hydraulic fluid is directed to the respective cylinders to cause extension and retraction thereof. In other articulated machines, the articulation may be performed by the use of a rotary vane motor that is located at the pivot point of the front and rear units and by providing pressurized fluid to one side or the other thereof to cause articulation for steering. In these arrangements, the powered portion of the machine normally requires interrupting the power to at least one of the drive wheels or applying a brake to one of the wheels to initiate steering or articulation of the machine. Likewise, in these arrangements, a differential unit is provided in the drive mechanism in order to allow one wheel to turn at a different rate than the other during steering of the machine. Additionally, most of these units require a differential lock in order to continuously provide power to both wheels when operating in a straight direction.

The present invention is directed to overcoming one or more of the problems as set forth above.

DISCLOSURE OF THE INVENTION

In one aspect of the present invention, an articulated machine is provided and includes a front unit and an articulated rear unit connected thereto. The front unit includes a source of power, first and second output drive members, and a unitary powered differential and steering mechanism. The unitary powered differential and steering mechanism is connected to the source of power and disposed between the first and second output drive members and operative to provide both drive power and steering of the machine. The present invention provides a steering arrangement for an articulated machine in which the steering cylinders are eliminated and the unitary powered differential and steering mechanism continuously provides power to the drive wheels of the machine and likewise is operative to vary the output speed to each of the drive wheels in order to initiate steering of the machine.

BEST MODE FOR CARRYING OUT THE INVENTION

Figure 1:
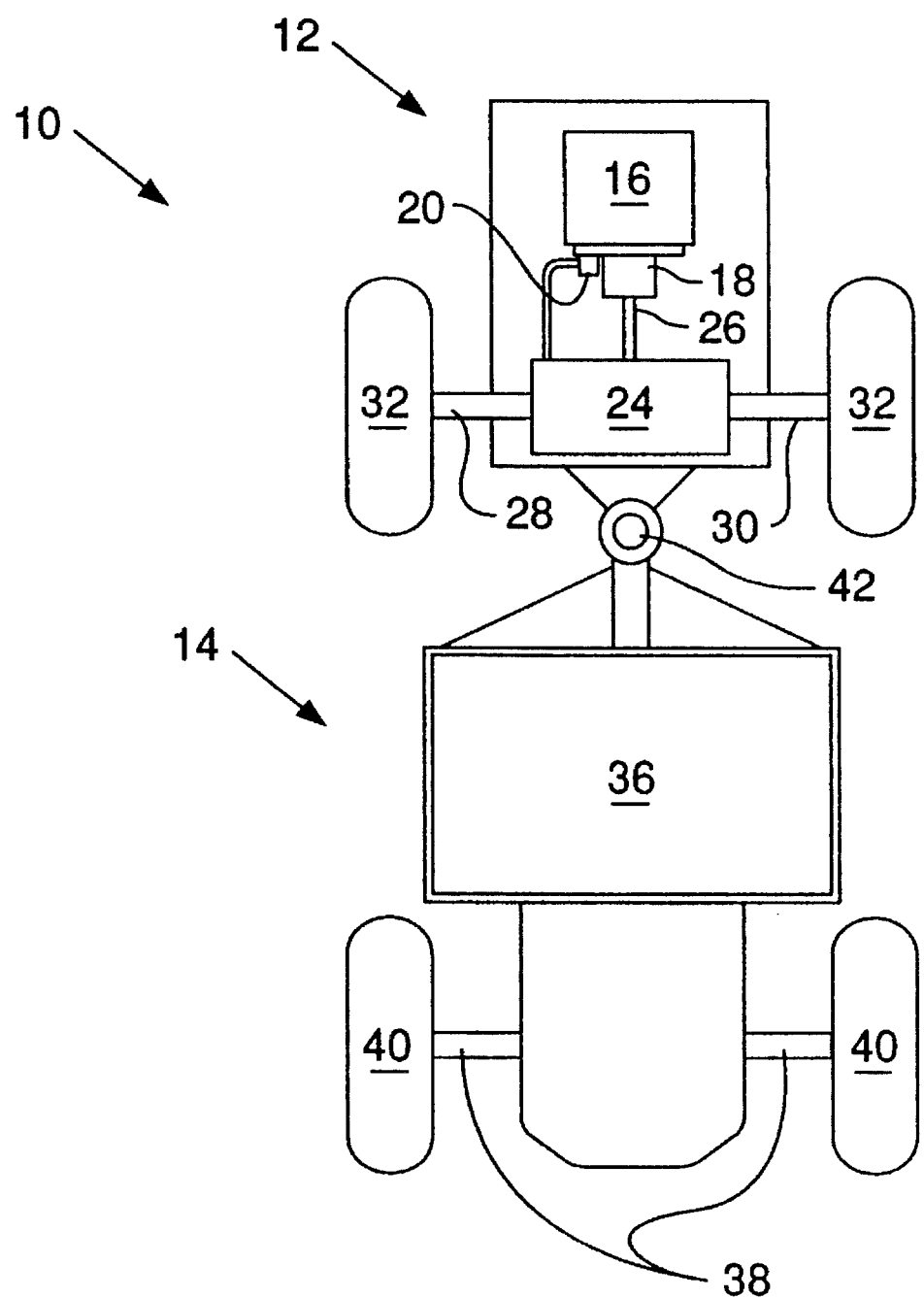
FIG. 1 is a diagrammatic representation of an articulated machine incorporating an embodiment of the present invention.

Referring to FIG. 1, an articulated machine 10 is illustrated and includes a front unit 12 and an attached rear unit 14. The front unit 12 includes a source of power, such as an engine 16, a transmission 18, a source of pressurized fluid, such as a pump 20, a unitary powered differential and steering mechanism 24 connected to the transmission 18 by a drive shaft 26. First and second output drive member 28,30 serve as an axle arrangement and are respectively connected to a pair of wheels 32.

The rear unit includes a body portion 36, a rear axle 38, and a pair of rear wheels 40. The front unit 12 and the rear unit 14 are connected together at a pivot connection 42.

Figure 2:
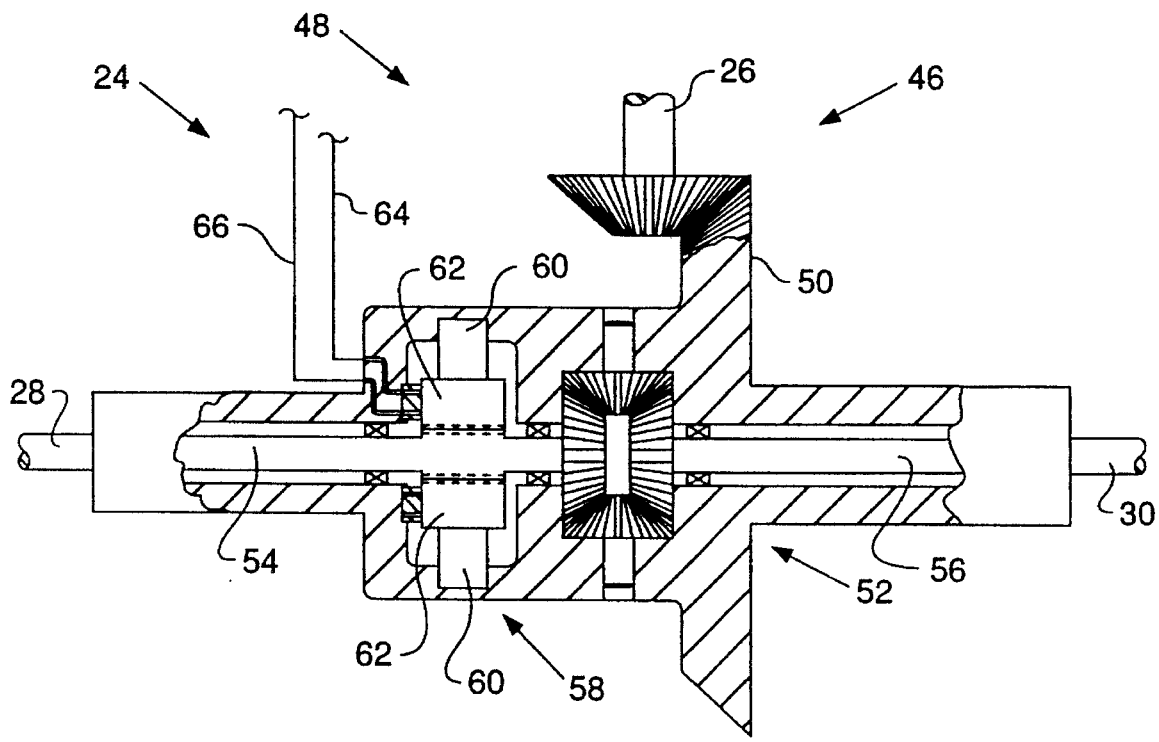
FIG. 2 is a diagrammatic representation of a portion of FIG. 1 illustrating in more detail the embodiment of the present invention.

Referring to FIG. 2, the unitary powered differential and steering mechanism 24 is illustrated in greater detail. The unitary powered differential and steering mechanism 24 includes a geared differential portion 46 and a hydromechanical portion 48. The geared differential portion 46 includes an input member 50, a mechanical beveled gear arrangement 52, a first output shaft 54 integrally connected to the first output drive member 28 and a second output shaft 56 integrally connected to the second output drive member 30.

The hydro-mechanical portion 48 includes a rotatable motor 58 having a drive unit 60 operatively coupled to the input member 50 of the geared differential portion and a driven unit 62 that is operatively coupled to the first output shaft 54. The rotatable motor 58 is fluidly connected to the pump 20 by respective conduits 64,66. The rotatable motor 58 operates in a well known manner in which the drive unit 60 has an eccentric cam plate and the driven unit 62 has a plurality of piston assemblies (not shown) that receive and discharge fluid therefrom through the respective conduits 64,66 in a well known manner. For additional details relating to a known rotatable motor, please refer to U.S. Pat. No. 5,396,768 issued on Mar. 14, 1995.

Industrial Applicability

In the operation of the articulated machine 10 illustrated in the drawings, the operator makes an input to the transmission 18 to deliver power through the drive shaft 26 to the unitary powered differential and steering mechanism 24. The power from the drive shaft 26 is transferred to the input member 50 and subsequently through the mechanical beveled gear arrangement 52 in a well known manner to deliver power to the respective first and second output drive members 28,30 through the respective first and second output shafts 54,56. During this straight ahead movement of the articulated machine 10, power is equally delivered to each of the front wheels 32. During this straight ahead travel, there is no flow being delivered from the pump 20 to the rotatable motor 58. Consequently, the drive unit 60 and the driven unit 62 are locked from relative rotation. Therefore, the drive unit 60 and the driven unit 62 are rotating as one integral unit. Since the driven unit 62 is integrally coupled to first output shaft 54, the power being delivered through the input member 50 is being directed to both of the first and second shafts 54,56. The unitary powered differential and steering mechanism 24, during the straight ahead mode of operation, provides an integral differential lock between the first and second output drive members 28,30.

When it is desired to steer the articulated machine in one direction or the other, the operator makes an input to cause the pump 20 to direct pressurized fluid through one of the conduits 64,66 to the rotatable motor 58. The return flow from the rotatable motor is delivered back to the pump 20 through the other of the conduits 64,66. The pressurized fluid being delivered to the rotatable motor 54 causes the drive unit 60 to rotate relative to the driven unit 62. This relative rotation between the drive unit 60 and the driven unit 62 results in the speed of the first output shaft 54 being varied from its initial rate of rotation. Since the rate of rotation of the first output shaft 54 is changed with respect to the rate of rotation of the second output shaft 56, the front unit 12 of the articulated machine 10 is caused to turn in the direction of the slowest turning wheel 32. This turning of the front unit 12 results in the front unit 12 articulating relative to the rear unit resulting in the articulated machine steering in the direction of the slowest turning wheel 32. The rate of steering is determined by the volume of pressurized fluid being delivered from the pump 20 to the rotatable motor 58. The greater the volume of fluid being delivered from the pump 20, the higher the rate of steer. Once the rate of relative rotation between the drive unit 60 and the driven unit 62 of the rotatable motor 24 becomes equal and opposite to the speed of the input member 50, the speed of the first output shaft 54 is zero. Additional increases in the relative rotational speed of the drive unit 60 and the driven unit 62 results in the first output shaft 54 turning in an opposite direction as compared to the second output shaft 56.

If it is desired to steer the articulated machine 10 in the opposite direction, the operator makes an input to the pump 20 to direct pressurized fluid through the other of the conduits 64,66 to the rotatable motor 58 which results in the driven unit 62 turning in the opposite direction relative to the drive unit 60. Assuming that in the above noted description that operation of the rotatable motor 58 caused the first output shaft 54 to decrease in relative rotation, by operating the rotatable motor in the opposite direction, the first output shaft 54 is caused to rotate at a rate greater than the rate of the second output shaft 56. This results in the machine 10 steering in the opposite direction since the relative rotation of the second output shaft 56 is turning at a slower rate than the relative rotation of the first output shaft 54. As noted with respect to steering in the other direction, power is continuously being delivered to both of the front wheels 32 through the first and second output drive shaft members 28,30.

In view of the foregoing, it is readily apparent that the unitary powered differential and steering mechanism 24 provides a simple steering arrangement for an articulated machine that eliminates the externally mounted cylinders that are typically used for steering the articulated machines while, at the same time, providing a drive arrangement that directs continuous power to both of the front wheels 32 during steering and likewise maintains a powered lock between the respective first and second output drive member 28,30 at all times without requiring a separate differential lock. It is recognized that the subject unitary powered differential and steering mechanism 24 could be used in conjunction with externally mounted cylinders if so desired.

Other aspects, objects and advantages of the invention can be obtained from a study of the drawings, the disclosure and the appended claims.

I claim:

1. An articulated machine, comprising:

a front unit having a source of power, first and second output drive members, and a unitary powered differential and steering mechanism having a geared differential portion and a hydro-mechanical portion is connected to the source of power and disposed between the first and second output drive members; and a rear unit connected to and, in use, articulates with respect to the front unit.

2. The articulated machine of claim 1 wherein the geared differential portion has an input member connected to the power source, a mechanical bevel gear arrangement, and first and second output shafts connected to the respective first and second output drive members.

3. The articulated machine of claim 2 wherein the front unit of the articulated machine includes a source of pressurized fluid and the hydro-mechanical portion includes a rotatable motor fluidly connected to the source of pressurized fluid.

4. The articulated machine of claim 3 wherein the rotatable motor has a drive unit coupled to the input member of the geared differential portion and a driven unit coupled to the first output drive member.

5. The articulated machine of claim 4 wherein the drive unit of the rotatable motor rotates relative to the driven unit in response to fluid flow from the source of pressurized fluid.

* * * * *